US009414156B2

(12) United States Patent
Bithell et al.

(10) Patent No.: US 9,414,156 B2
(45) Date of Patent: Aug. 9, 2016

(54) REDUCING RESONANCE

(71) Applicant: SONTIA LOGIC LTD, Sheffield (GB)

(72) Inventors: Alan Bithell, Sheffield (GB); James Hedges, Sheffield (GB); Weiming Li, Sheffield (GB); Christopher David Vernon, Beverley (GB)

(73) Assignee: Sontia Logic Limited, Dronfield (GB)

( * ) Notice: Subject to any disclaimer, the term of this patent is extended or adjusted under 35 U.S.C. 154(b) by 162 days.

(21) Appl. No.: 14/363,710

(22) PCT Filed: Dec. 6, 2012

(86) PCT No.: PCT/GB2012/000889

§ 371 (c)(1),
(2) Date: Jun. 6, 2014

(87) PCT Pub. No.: WO2013/083947

PCT Pub. Date: Jun. 13, 2013

(65) Prior Publication Data

US 2014/0321666 A1 Oct. 30, 2014

(51) Int. Cl.
*H04B 15/00* (2006.01)
*H04R 3/00* (2006.01)
*H04R 3/04* (2006.01)

(52) U.S. Cl.
CPC . *H04R 3/002* (2013.01); *H04R 3/04* (2013.01)

(58) Field of Classification Search
CPC .................................. H04R 3/04; H04R 3/002
USPC ........................................................ 381/94.1
See application file for complete search history.

(56) References Cited

U.S. PATENT DOCUMENTS 4,628,530 A 12/1986 Op De Beek et al.
6,067,362 A * 5/2000 Lemanski ................ H04R 5/02 348/738

(Continued)

FOREIGN PATENT DOCUMENTS

EP 0119645 A1 9/1984
GB 2469573 A 10/2010

(Continued)

OTHER PUBLICATIONS

International Search Report and Written Opinion of the ISA for PCT/GB2012/000889, ISA/EP, Rijswijk, NL, mailed Apr. 3, 2013.
Search Report under Section 17 for GB 1121077.0, mailed Apr. 4, 2012.
Search Report under Section 17 for GB 1222048.9, mailed Feb. 27, 2013.

*Primary Examiner* — Paul S Kim
(74) *Attorney, Agent, or Firm* — Harness, Dickey & Pierce, P.L.C.

(57) ABSTRACT

Techniques are described for processing an audio signal to reduce the total harmonic distortion caused when it is reproduced by a loudspeaker, which is located within an audio reproduction device having an enclosure with an associated resonant frequency. After receiving the input audio signal, which includes the resonant frequency of the enclosure, the level of the input audio signal at the resonant frequency is reduced, thereby producing a first processed signal. In addition, the level of said input audio signal is reduced at all frequencies, producing a second processed signal. The first and second processed signals are combined to produce an output audio signal. The degree to which the level of the audio signal at both the resonant frequency and at all frequencies is reduced may be dependent upon the current volume level.

13 Claims, 15 Drawing Sheets

(56) References Cited

U.S. PATENT DOCUMENTS

| | | | |
|---|---|---|---|
| 2004/0022399 | A1 | 2/2004 | Combest et al. |
| 2010/0166197 | A1 | 7/2010 | Fukuda et al. |

FOREIGN PATENT DOCUMENTS

| | | | |
|---|---|---|---|
| GB | 2491130 | A | 11/2012 |
| WO | WO-01/11918 | A2 | 2/2001 |

* cited by examiner

REDUCING RESONANCE

CROSS REFERENCE TO RELATED APPLICATIONS

This application is a 371 U.S. National Phase of PCT/GB2012/000889, filed Dec. 6, 2012, which claims priority from United Kingdom patent application number 11 21 077.0, filed Dec. 8, 2011, the entire disclosure of which is incorporated herein by reference in its entirety.

BACKGROUND OF THE INVENTION

1. Field of the Invention

The present invention relates to a method of processing an input audio signal, an audio reproduction system, and an audio processing apparatus.

2. Description of the Related Art

Audio signal processing techniques using both analog and digital electronics are commonplace. For instance, techniques for processing audio signals exist to enhance the perceived bass response of a loudspeaker, an example of which is described in United Kingdom patent number 2 469 573 B, assigned to the present applicant. Furthermore, techniques exist for reducing harmonic distortion of audio by a loudspeaker, an example of which is described in United Kingdom patent publication number 2 491 130 A, the corresponding application of which is also assigned to the present applicant.

Whilst numerous techniques exist for improving the frequency and phase responses of audio reproduction systems, the very properties of the construction of the audio reproduction systems can cause much greater distortions that are many times more noticeable to a listener than frequency and phase distortions. Many electronic devices suitable for reproducing audio signals are not designed with high fidelity reproduction in mind—the addition of audio reproduction functionality having either being born out of necessity or simply being an afterthought.

Thus, the lack of suitable construction techniques for many consumer-level electronic devices can often lead to distortion of audio during playback. This is in particular due to mechanical vibration of the components of the device itself, usually caused by audio including a resonant frequency of the device being supplied to a loudspeaker located within the device. Many manufacturers attempt to solve this issue by introducing dampening materials into the device, such as rubber gaskets around interfaces between surfaces. However, this is unsatisfactory in many situations, as adding these dampening materials can in many cases be economically unviable. A technical approach to providing an innovative solution to this problem, operating within economic constraints, has hitherto been unforthcoming.

BRIEF SUMMARY OF THE INVENTION

According to an aspect of the present invention, there is provided a method comprising processing an input audio signal to reduce total harmonic distortion of the input audio signal when the audio signal is reproduced by a loudspeaker, said loudspeaker being located within an audio reproduction device having an enclosure with an associated resonant frequency, said method including steps of: (a) receiving said input audio signal, which includes the resonant frequency of the enclosure; (b) reducing the level of said input audio signal at the resonant frequency of the enclosure, thereby producing a first processed signal; (c) reducing the level of said input audio signal at all frequencies, thereby producing a second processed signal; (d) combining said first processed signal and said second processed signal to produce an output audio signal.

According to another aspect of the present invention, there is provided an audio reproduction system, comprising an amplifier, a loudspeaker, an enclosure with an associated resonant frequency, and a processing device for processing an input audio signal to reduce the degree of total harmonic distortion exhibited by said apparatus when it is reproduced by said loudspeaker, wherein said processor is configured to: (a) receive said input audio signal, which includes the resonant frequency of the enclosure; (b) reduce the level of said input audio signal at the resonant frequency of said enclosure to produce a first processed signal; (c) reduce the level of said input audio signal at all frequencies to produce a second processed signal; (d) combine said first processed signal and said second processed signal to produce an output audio signal for amplification by said amplifier.

According to a further aspect of the present invention, there is provided audio processing apparatus for processing an input audio signal to reduce the degree of total harmonic distortion exhibited by an audio reproduction system when said input audio signal is reproduced by a loudspeaker located therein, said audio reproduction system having an enclosure with an associated resonant frequency, and wherein said audio processing apparatus comprises an input interface configured to receive an input audio signal, an output interface configured to output an output audio signal, and a processor configured to: (a) receive an input audio signal via said input interface, wherein said input audio signal includes the resonant frequency of the enclosure; (b) reduce the level of said input audio signal at the resonant frequency of said enclosure to produce a first processed signal; (c) reduce the level of said input audio signal at all frequencies to produce a second processed signal; (d) combine said first processed signal and said second processed signal to produce an output audio signal for output via said output interface.

DETAILED DESCRIPTION OF EXAMPLE EMBODIMENTS

Overview of the Invention

At a basic level, the present invention processes an input audio signal to reduce the total harmonic distortion when it is reproduced by a loudspeaker located within an audio reproduction device having an enclosure with an associated resonant frequency. As will become apparent to those skilled in the art, the techniques employed by the present invention are applicable across a wide range of such devices.

FIG. 1

Figure 1:
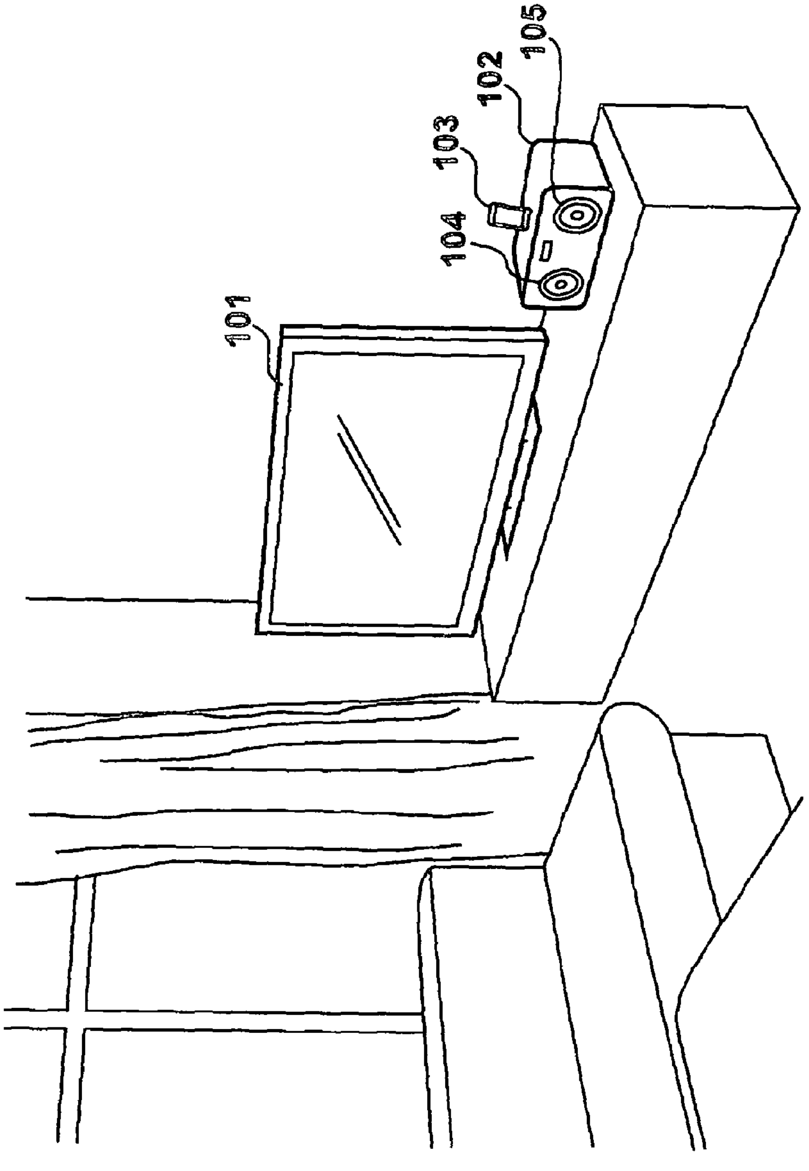
FIG. 1 shows an environment suitable for applying the principles of the present invention.

An environment particularly suitable for applying the principles of the present invention is illustrated in FIG. 1.

As shown in the Figure, a room contains both a television 101 and a small stereo system 102. Stereo system 102 is adapted to be a "dock" for a mobile telephone 103, or alternatively a personal music player. Whilst mobile phone 103 is shown docked with stereo system 102, in a configuration wherein audio, stored on the mobile telephone, is reproduced by the stereo system, it will be appreciated that the mobile phone is capable of reproducing audio itself by using an internal loudspeaker.

As can be seen, the primary design motivation behind television 101, stereo system 102 and mobile telephone 103 is not one of high fidelity audio reproduction. In particular, being an LCD-type display, television 101 is primarily designed to be as thin as possible, leading to compromises in terms of built-in loudspeaker size and construction. Further, stereo system 102 does not have separate loudspeakers—instead, they are integrated type wide-band drive units 104 and 105. Mobile telephone 103 is also not designed with high quality audio reproduction in mind—it is designed to be portable, and its incorporated loudspeaker drive unit, primarily designed with speech-frequency audio reproduction, is not intended for high-quality audio reproduction.

Thus, it can be seen that whilst all of the devices shown in the Figure are capable of audio reproduction, the quality of audio reproduction is not their primary design focus. Whilst not shown in the accompanying drawings, other typical examples of such devices include tablet computers and personal computers, particularly laptops. Again, these types of devices suffer from compromises in audio reproduction quality in favor of high-grade industrial design.

FIG. 2

Figure 2:
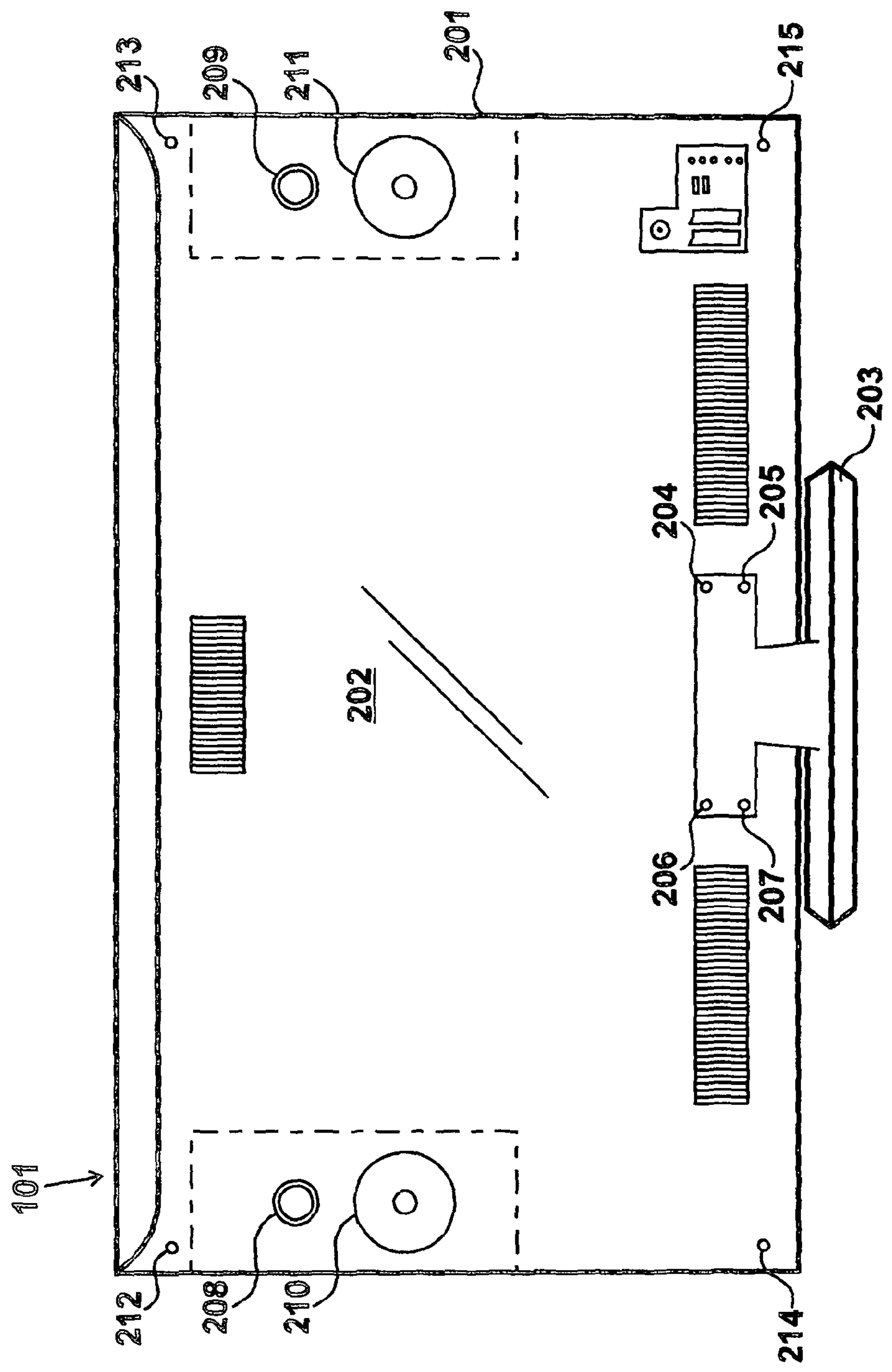
FIG. 2 shows the rear of a television.

The rear of television 101 is illustrated in FIG. 2, to give the reader an understanding of part of the cause of what may be considered sub-standard audio reproduction by the device.

As illustrated in FIG. 1, television 101 is relatively large, with, in this example, its display measuring 1 meter on its diagonal with a widescreen aspect ratio of 16:9. Alternative television models may be smaller or larger than this dimension, but still occupy a large area. Television 101 comprises an enclosure, the periphery of which is indicated at 201. The rear of the television's enclosure comprises a panel 202, which in this case is made of ABS plastic, although it could be constructed from any other suitable material. Panel 202 is attached to an internal chassis of the television by means of four bolts 212, 213, 214 and 215. In addition, whilst in this the rear of the television has a one-piece panel, it will be appreciated that other exemplary television designs will comprise a number of panels to cover the rear of the set.

Television 101 includes a support stand 203 that is attached to the rear of the set by four bolts 204, 206, 206 and 207. Thus, support stand 203 is directly attached to the rear of the television.

In addition, in this example television 101 also includes four loudspeakers - two tweeters 208 and 209, and two woofers 210 and 211 operating in a stereo configuration. Thus, it can be seen that tweeter 208 and woofer 210 are on one side of the set and tweeter 209 and woofer 211 are on the other side of the set. The loudspeakers are covered by panel 202, and the drive units are attached directly to the chassis of the television. Further components within the television are positioned behind panel 202, and either being bolted, glued or attached by means of an interference fit to the internal chassis of the television.

As mentioned previously, television 101 measures 1 meter on its diagonal, to give a surface area of 0.42 meters squared. Given that panel 202 covers the entirety of the rear of television 102, it too has this surface area, and therefore represents a large, thin surface that is susceptible to mechanical vibration. Other components within the television will also vibrate. As the level of sound produced by the four loudspeakers increases, this mechanical vibration will clearly become more pronounced, both through the loudspeakers themselves causing the entire television's enclosure to move and through the air being moved by the loudspeakers having an effect on the enclosure. At various frequencies of sound, resonant modes of vibration will also exist, which will be perceived by a listener as a sudden increase in the distortion caused by the mechanical vibration of the various components forming television 101. In some cases, the resonant modes of the enclosure may occur at all volume levels, whilst in other cases, the occurrence of resonant modes may be dependent upon the volume level.

Previous approaches to reducing this distortion involve a simplistic introduction of sound-deadening materials into the construction of the television. However, such materials are used reluctantly for economic reasons, and often only find their way into high-end devices.

It will be appreciated by the reader that whilst the vibration and distortion described above makes reference to a television set, such effects are also commonplace in devices such as stereo system 102 and mobile telephone 103, both described previously with reference to FIG. 1.

FIG. 3

Figure 3:
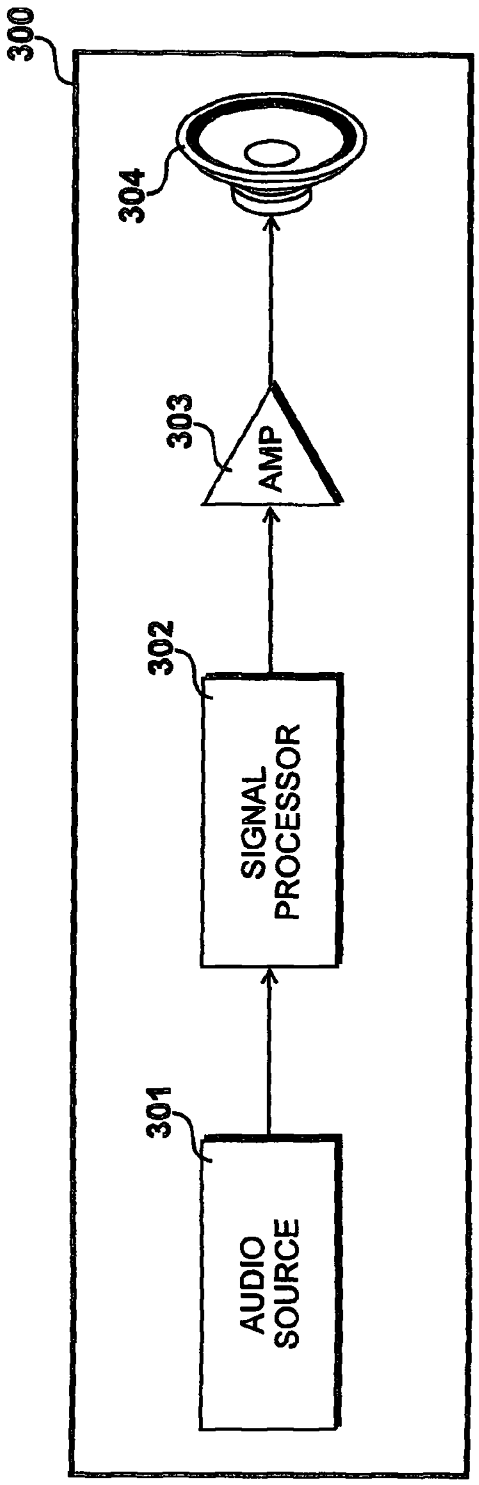
FIG. 3 is a block diagram of typical components used for audio reproduction.

A block diagram of typical components used for audio reproduction in a device such as television 101 or stereo system 102, is shown in FIG. 3.

An enclosure 300 is present around the components in the device. An audio source 301 is present, which in the case of a television could be the television signal decoder, or in the case of a stereo system could be a compact disc. Audio source 301 provides an input audio signal to a signal processor 302, which provides a degree of processing to the signal. The input audio signal may either be analog or digital, depending upon the embodiment. Thus, depending upon the type of the signal, signal processor 302 can be implemented using either analog or digital electronics, as will be described with reference to the later Figures. Following processing of the input audio signal, an output audio signal is provided to an amplifier 303, which is configured to amplify the output audio signal and provide it to a loudspeaker 304. As will be appreciated by those skilled in the art, loudspeaker 304 may either be a single wide-band drive unit or may comprise a tweeter and a woofer with an appropriate crossover network between the two.

The present applicant has appreciated that a degree of signal processing capability is present in many of the devices that exhibit a degree of distortion due to mechanical vibration and resonances of their enclosures. Thus, the present invention seeks to utilize this capability in a technical approach to overcoming these problems. By processing the input audio signal from audio source 301 using a precisely constructed filter, it is possible to suppress distortion due to resonance, allowing higher volume levels to be used without the device exhibiting rattle.

Device Characterisation

This description now turns to the manner in which a device can be characterized and a suitable filter derived so as to suppress resonance. An analytical approach to creating a processing algorithm to reduce distortion would be difficult due to the inherent complexities in modeling the interaction between each and every component within a device that can contribute to total harmonic distortion through vibration. Thus, the present invention employs empirical characterization of a device to construct an appropriate filter to achieve its aims.

FIG. 4

Figure 4:
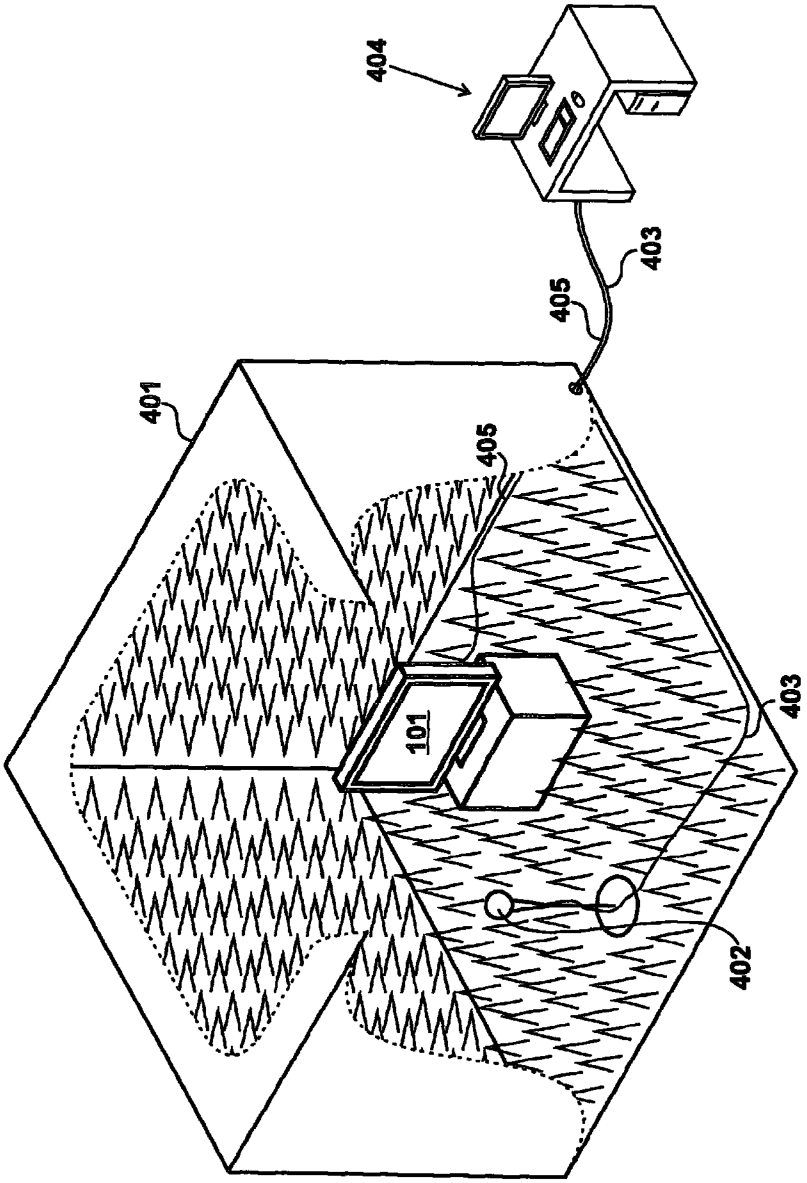
FIG. 4 illustrates an exemplary test environment.

An exemplary test environment is illustrated in FIG. 4.

A device under test, which is in this example television 101, is shown placed in a substantially anechoic chamber 401. Alternatively, the device under test can be placed in a pre-characterized space or a "known room", that is to say a space that has been characterized and thus has a known transfer function which can be used to deconvolve a test signal and recover a substantially identical signal to that obtained in an anechoic chamber.

A microphone 402 is placed at a notional listening position within the anechoic chamber, and is connected via a cable 403 to a computer workstation 404 outside the anechoic chamber. The device under test, in this case television 101, is also connected to computer workstation 404 via another cable 405. Thus, in this example, under the control of computer workstation 404, television 101 is supplied with at least one test signal comprising a plurality of frequencies in a frequency sweep. Television 101 then reproduces the signal, and the resultant sound is detected by microphone 402. The output of microphone 402 is then received by computer workstation 404, whereupon it is, processed. The procedure of testing a candidate audio reproduction device, such as television 101 or stereo system 102 will be described in further detail with reference to FIGS. 5 to 8.

FIG. 5

Figure 5:
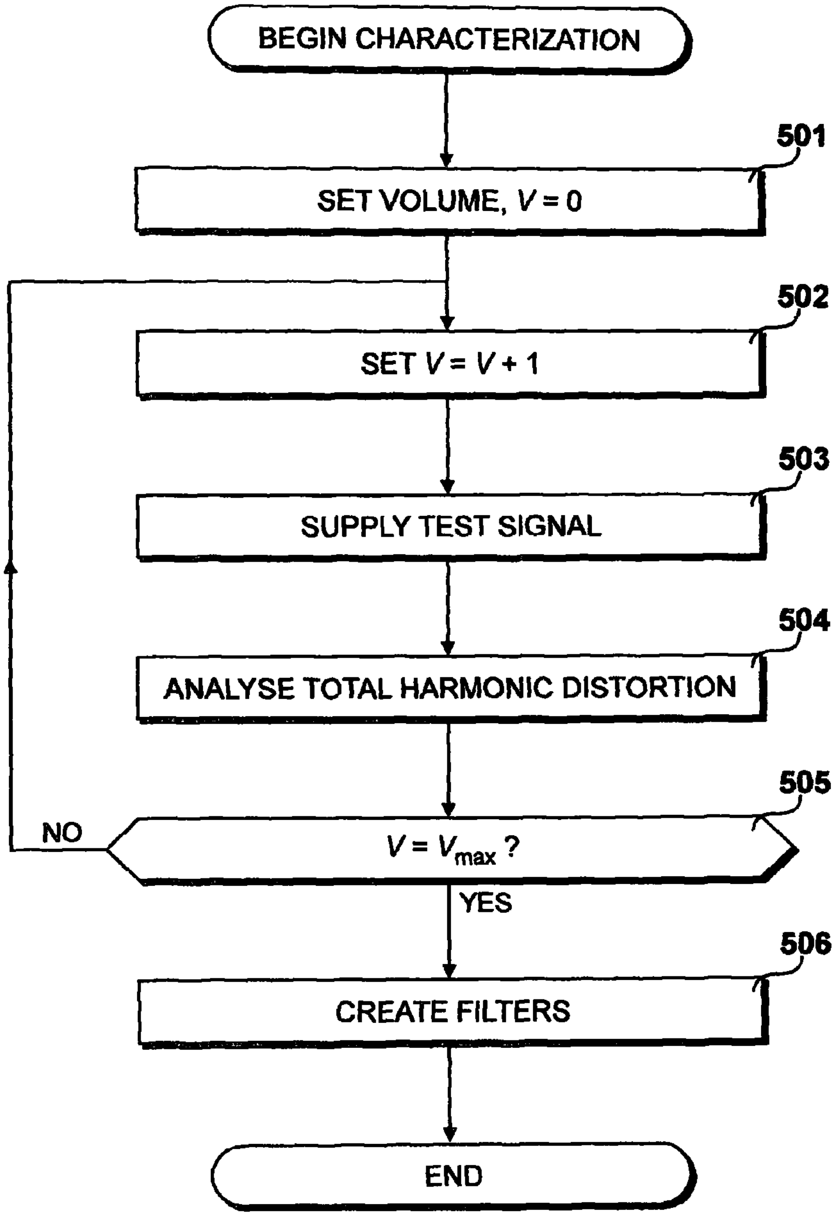
FIG. 5 shows a procedure for characterizing a device.

An overview of procedures undertaken to characterize a device under test in the environment illustrated in FIG. 4, is shown in FIG. 5.

Characterization begins, and at step 501, the volume setting V of the device under test is set to be zero. At step 502, a new value of V is set to be V plus one, and at step 503 a test signal is supplied to the device under test, which includes a procedure of recording the output from the device. The process of supplying a test signal will be described further with reference to FIG. 6. At step 504, the total harmonic distortion present in the recorded output from the device is analyzed - this process will be described further with reference to FIG. 7. At step 505, a question is asked as to whether the current volume setting V on the device under test is at the maximum, $V_{max}$. If this question is answered in the negative, then control returns to step 502 where the next volume level is selected. If answered in the affirmative, then control proceeds to step 506 where filters are created and characterization of the device is complete. The process of creating filters will be described further with reference to FIG. 8.

As will be apparent to the skilled reader, in this procedure characterization of a device is carried out at all volume levels that it is capable of producing. However, it may be the case that a device is simply characterized at its maximum volume level, with one filter being produced and processing for all volume levels taking place on that single volume level.

FIG. 6

Figure 6:
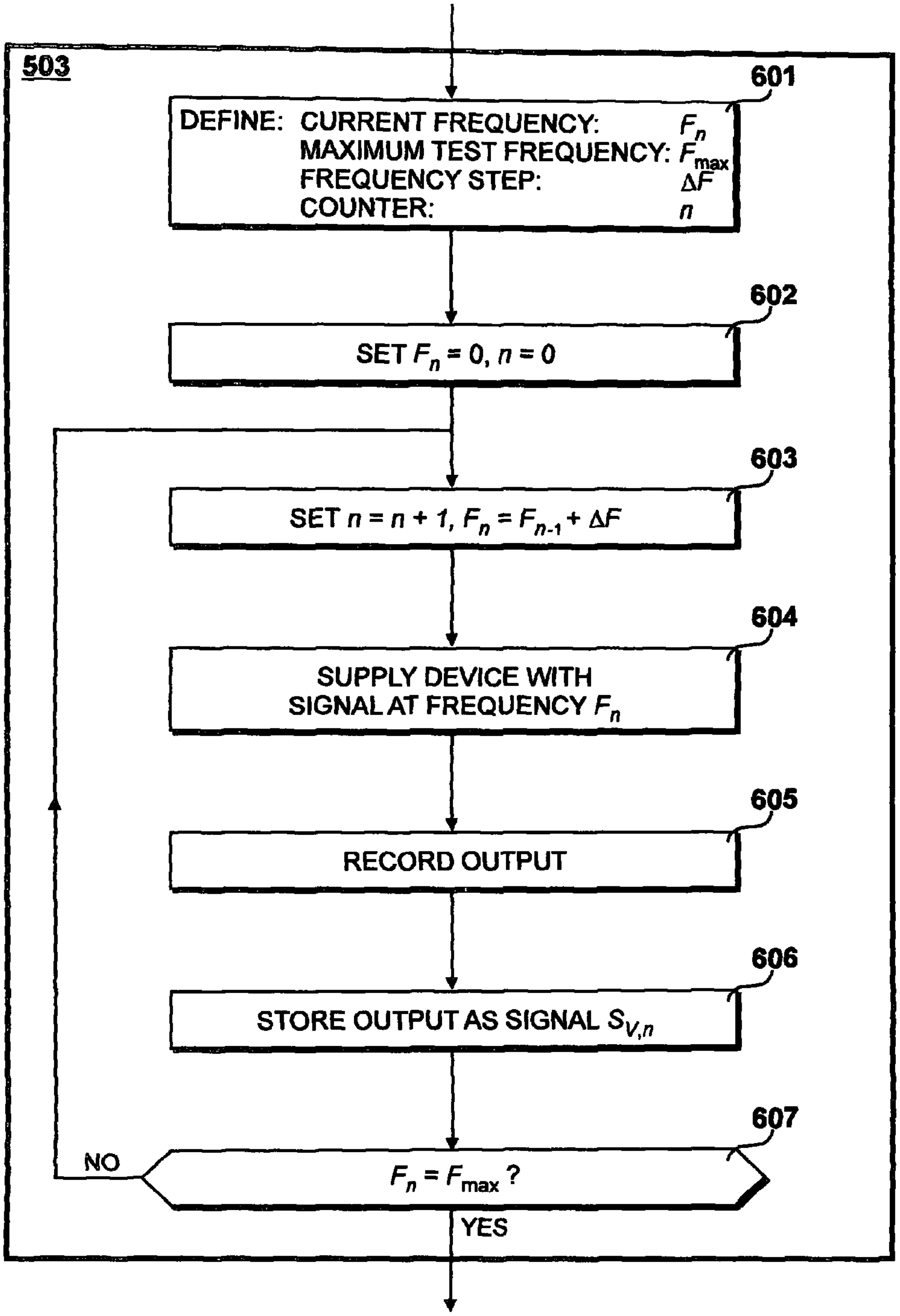
FIG. 6 shows a procedure for performing a frequency sweep.

The procedure used by the present invention to provide a frequency sweep to a device under test is illustrated in FIG. 6.

At step 601, several constants are defined: $F_n$ is a variable representing the current frequency to be supplied to the device under test, constant $F_{max}$ is the maximum test frequency to be supplied, constant ΔF is the frequency step to be used during the test and the variable n is a counter. In the present case, $F_{max}$ is 20 kilohertz and ΔF is 20 hertz.

At step 602, n and $F_n$ are set to be zero. Thus, the frequency $F_0$ is equal to zero. At step 603, the counter n is incremented by one and the current frequency $F_n$ is set to be the frequency $F_{n-1}+\Delta F$. Thus, the frequency $F_1$ is equal to $F_0+\Delta F$. At step 604, the device under test is supplied with a signal at frequency $F_n$ which it then reproduces at the current volume level V. The reproduced audio is recorded by microphone 402 at step 605, and the signal from microphone is stored as a signal $S_{V,n}$ which is the nth recorded signal at volume level V. At step 606, a question is asked as to whether the current frequency is equal to the maximum frequency. If answered in the negative, then control returns to step 603 and the next frequency is supplied to the device under test. If answered in the affirmative, then step 503 is complete, and there will be a complete set of stored signals $S_{V,n}$ corresponding to each frequency step at volume level V.

FIG. 7

Figure 7:
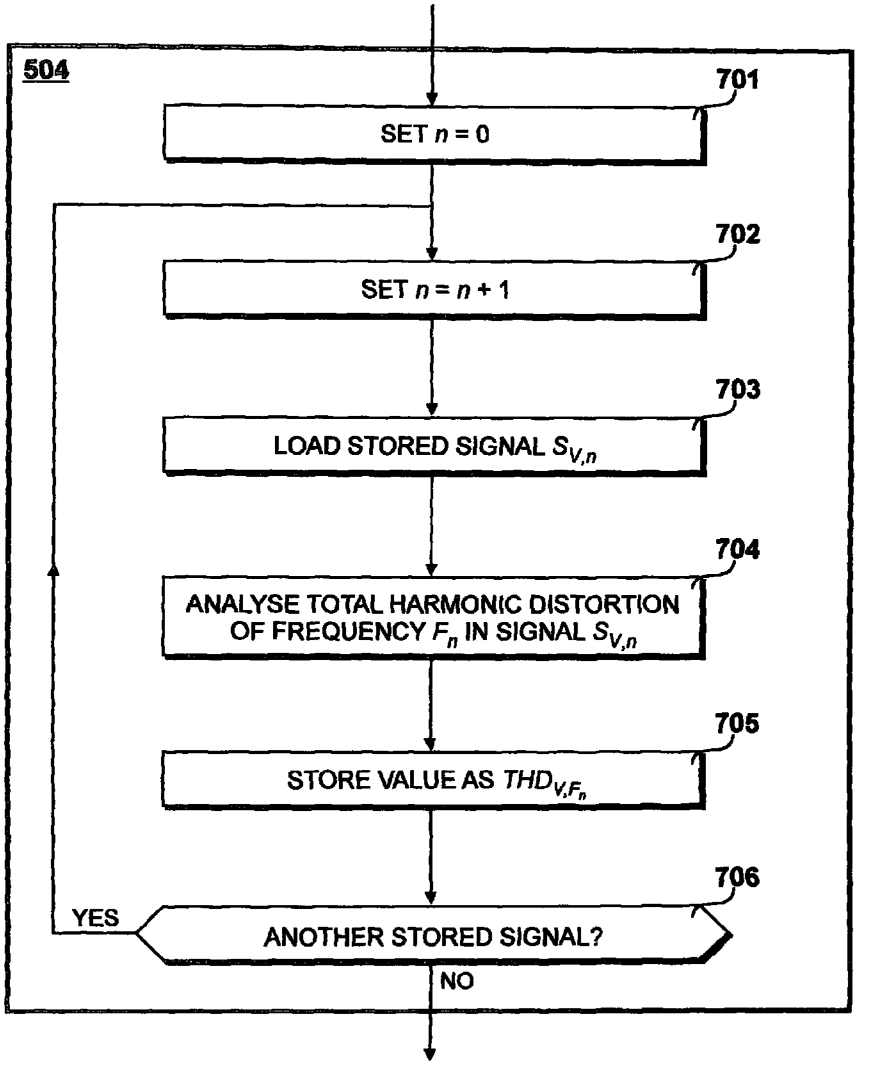
FIG. 7 shows a procedure for analyzing total harmonic distortion.

The process of analyzing the total harmonic distortion in a full set of stored signals is illustrated in FIG. 7.

At step 701, counter n is set to be equal to zero, and at step 702 it is incremented by one. The stored signal $S_{V,n}$ is then loaded at step 703, which will describe the frequency response of the device to a particular frequency $F_n$. At step 704, the total harmonic distortion of the frequency $F_n$ in signal $S_{V,n}$ is analyzed, which results in the creation of a percentage value which is stored at step 705 as a value $THD_{V,Fn}$. As will be apparent to those skilled in the art, this value is the ratio of the sum of the powers of all harmonic components to the power of the fundamental frequency, $F_n$.

At step 706, a question is asked as to whether there is another stored frequency to analyze. If so, then control returns to step 702 where the counter n is incremented by one and then next stored signal is loaded. If answered in the negative, to the effect that all stored signals for volume level V have been analyzed for total harmonic distortion, then step 504 is complete.

FIG. 8

Figure 8:
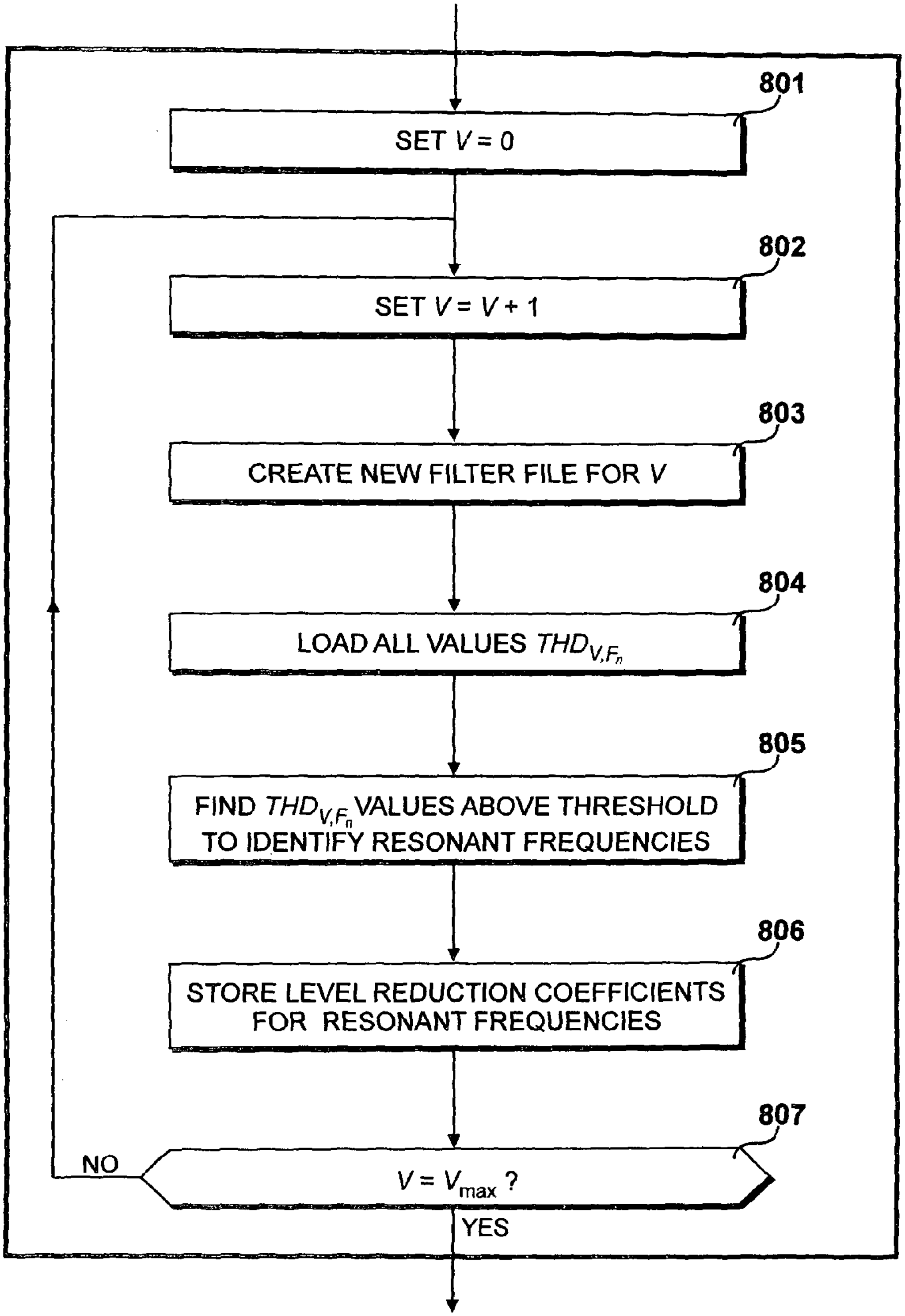
FIG. 8 shows a procedure for creating a filter to reduce distortion.

The process creating filters following the characterization of a device is illustrated in FIG. 8.

At step 801, the variable V is set to equal zero. At step 802, V is incremented by one. At step 803, a new filter preset file is created for the present volume level V. At step 804, all of the total harmonic distortion values for each frequency $F_n$ at volume level V are loaded, and at step 805, those frequencies having a total harmonic distortion above a certain level are identified as resonant frequencies. In this example, the threshold level of total harmonic distortion for a frequency to qualify as a resonant frequency is ten percent. At step 806, the resonant frequencies identified at step 805 are stored along with a coefficient identifying the degree of level reduction to apply to those frequencies to avoid resonance. In this example, the amount of level reduction applied is proportional to the amount of total harmonic distortion of the particular resonant frequency, but in other embodiments the degree of level reduction applied to resonant frequencies could be constant. Illustrations of the amount of level reduction applied are illustrated in FIGS. 10 and 13.

At step 807, a question is asked as to whether the volume level being analyzed is the maximum volume level, and if not, the control returns to step 802 where the next volume level is analyzed. If answered in the affirmative, then step 506 is complete and filter preset files have been created for each volume level.

Signal Processing Implementations

It has been found during listening tests performed by the present applicant that simply muting those frequencies that cause resonance leads to a rather noticeable presence of processing. By applying attenuation only at specific frequencies, the tonality of the sound produced by a device is affected. This is particularly noticeable when source content is at a low level. Thus, a high degree of amplification is required (a high volume setting), but this only brings the perceived level from the device to an acceptable range. However, attenuation will still be applied even though the reproduction of the source content would not in fact induce resonance.

The present invention therefore includes processing techniques not only for introducing attenuation at identified resonant frequencies, but also for introducing broadband attenuation (i.e. at all frequencies) when those resonant frequencies are present. The ratio in which these two processing techniques are combined can be altered to suit the source material, the device itself and a listener's own preferences.

At least two approaches to implementing such processing of input audio signals in order to achieve a reduction of total harmonic distortion exist. The first approach involves the use of analog electronics to achieve the required processing and may therefore require a separate audio signal processing apparatus, acting as a discrete signal processor, to be included in the device. However, the second approach makes use of the inclusion in many devices of high-speed microcontrollers and digital signal processors, and thus processes an input audio signal in the digital domain.

FIG. 9

Figure 9:
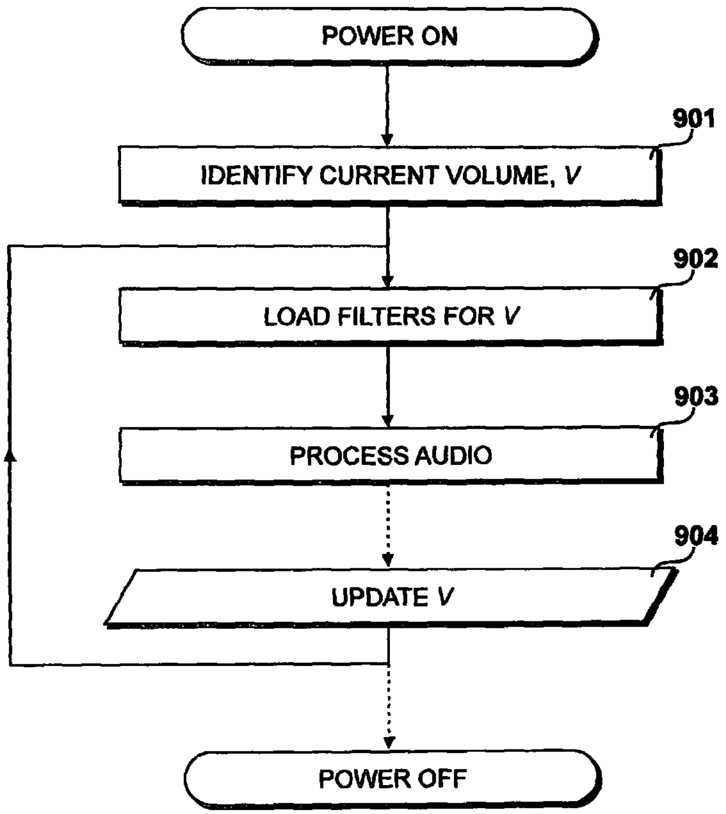
FIG. 9 is an overview of procedures undertaken by a device during operation.

Thus, at a general level, procedures carried out by an audio reproduction device in operation—and conforming substantially to the arrangement described previously with reference to FIG. 3 - are illustrated in FIG. 9.

After powering on, the current volume level is identified at step 901, and at step 902, the filter preset file for the current volume level is loaded. The device is then configured to process audio according to the filter, and processing takes place in step 903. This processing continues until the volume level is updated due to user intervention, say, at step 904, where control returns to step 902 where corresponding filters are loaded and processing continues.

As described previously with reference to FIG. 5, it may be the case that characterization of the audio reproduction device was only performed at one volume level, with only one filter being created. If this were to be the case, then the procedures carried out by the device during operation would be simply that of processing input audio on the basis of that filter, irrespective of the volume level.

Figure 10A:
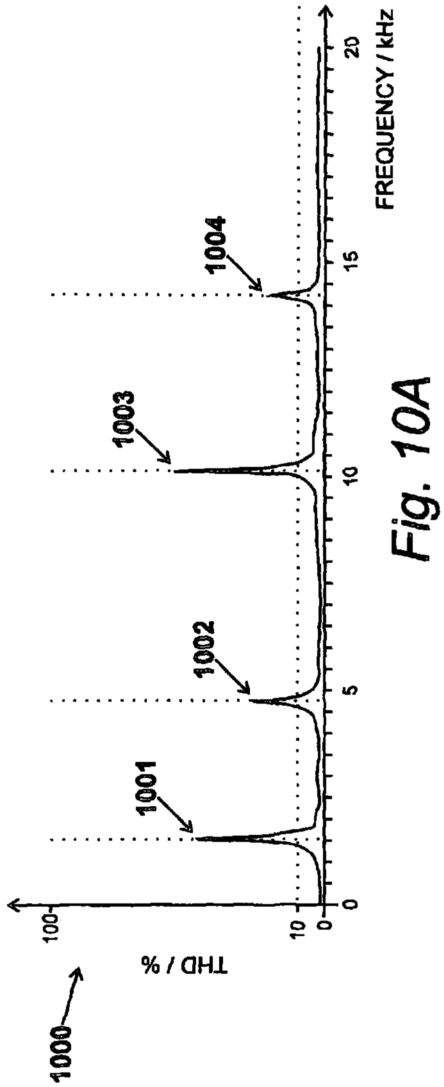
FIGS. 10A and 10B illustrate total harmonic distortion and a corresponding filter for analog processing.
Figure 10B:
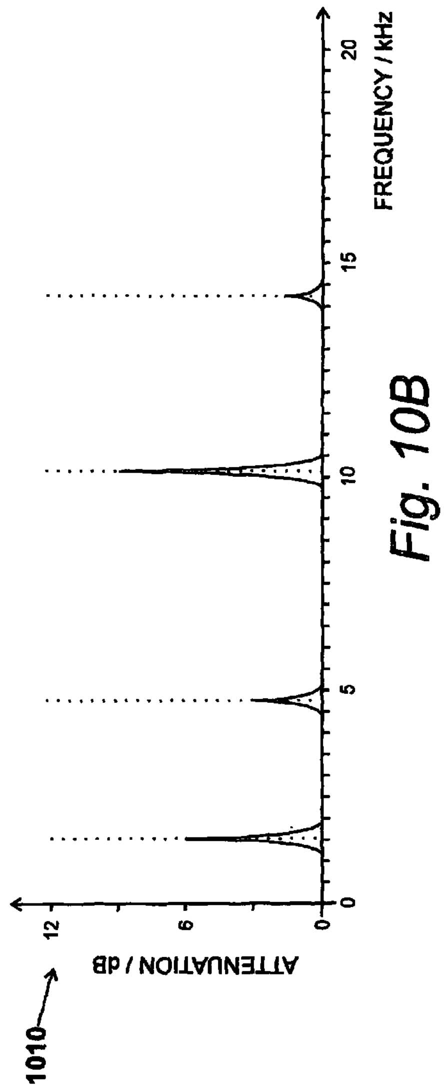

FIGS. 10A and 10B

As described previously with reference to FIG. 7, the analysis of a stored signal during device characterization produces a series of values for the total harmonic distortion of a range of fundamental frequencies. FIG. 10A includes a plot of an example set of total harmonic distortion values for a range of frequencies from 0 hertz to 20 kilohertz at one particular volume level, shown in the Figure as 1000, which plots frequency in kilohertz against total harmonic distortion in percent. The threshold of 10 percent total harmonic distortion, indicating a resonant frequency, is also shown. Thus, it can be seen that there are a number of large peaks in the graph at around 1.5 kilohertz, 4.75 kilohertz, 10 kilohertz and 14.25 kilohertz, indicated at 1001, 1002, 1003 and 1004 respectively. It will be appreciated that these values are purely exemplary—there could simply be a single peak, and it could be at any frequency—and the exact nature of the total harmonic distortion graph 1000 is entirely dependent upon the device that was under test.

Each of peaks 1001, 1002, 1003 and 1004, corresponding to an identified resonant frequency, rises above the exemplary 10 percent total harmonic distortion threshold described previously with reference to FIG. 7. Thus, the ideal filter to combat these resonant frequencies is as shown in FIG. 10B at 1010, which plots frequency in kilohertz against attenuation in decibels. As can be seen, zero attenuation is applied at all frequencies but those that cause resonance, and a degree of attenuation related to the total harmonic distortion is applied at the resonant frequencies. Thus, at 4.75 kilohertz, where 30 percent total harmonic distortion is exhibited, 3 decibels of attenuation is applied, whilst 10 kilohertz, where 50 percent total harmonic distortion is exhibited, 9 decibels of attenuation is applied. In essence, the present invention proposes to apply more attenuation to an input audio signal at frequencies where more total harmonic distortion is present.

In this example, using analog electronics, the filter will be implemented in equalization curves in an equalizer, and in a crossover network using notch filters and/or bandstop filters of the known type.

FIG. 11

As described previously, it has been appreciated by the present applicant that not only reducing the level of (attenuating) resonant frequencies in isolation, but also reducing the level of the entire input audio signal when those frequencies are present leads to a much less noticeable processing effect, whilst still presenting advantages in terms of distortion reduction.

Figure 11:
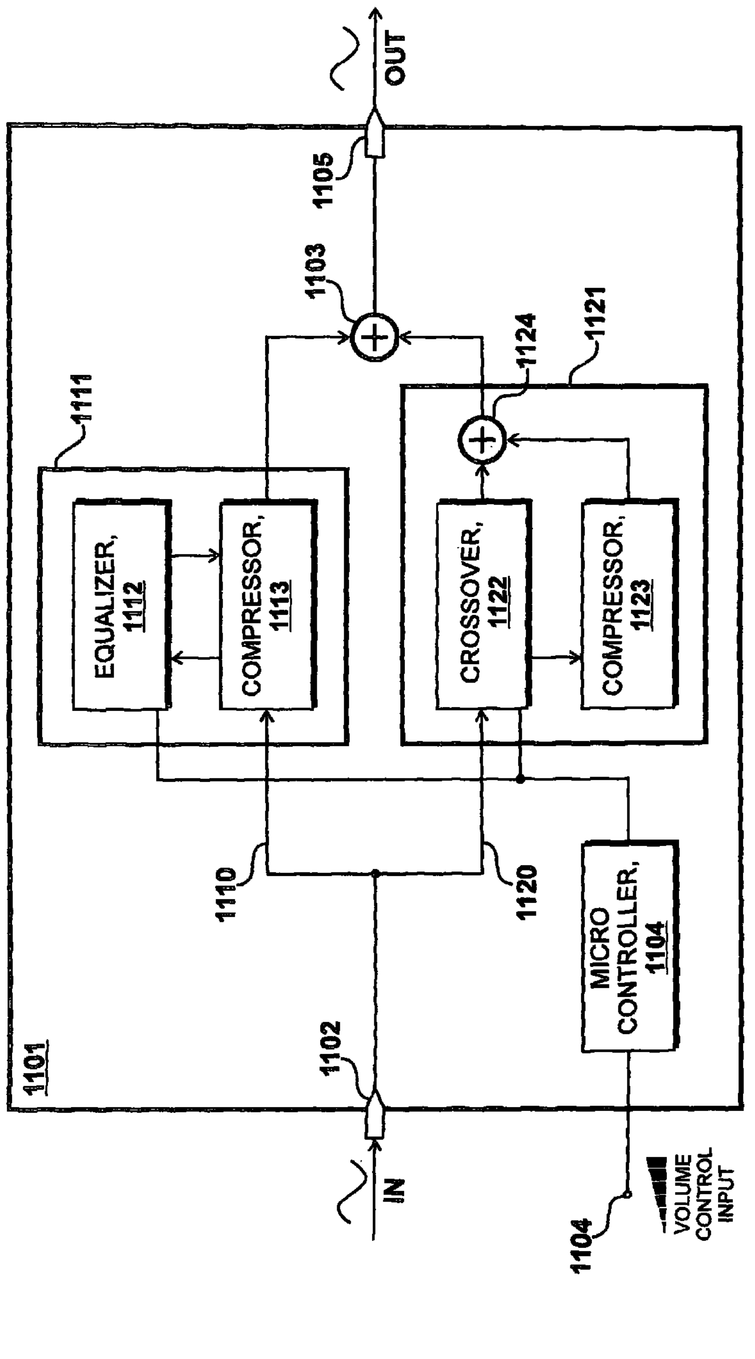
FIG. 11 shows a first signal processing apparatus for processing audio in the analog domain.

Thus, a first audio signal processing apparatus 1101 is illustrated in FIG. 11, suitable for implementing the principles of the present invention and fulfilling the role of signal processor 302.

An input interface 1102 is present, and is configured to receive an input audio signal. It will be appreciated for a device of its type, the input audio signal must be analog (that is to say, not quantized in some form), and so may have undergone a digital-to-analog conversion depending upon the input source. The input audio signal is then split into a first signal path 1110 including a side-chain compressor circuit 1111, and into a second signal path 1120 including a split-band compressor circuit 1121. Both compressors apply a degree of filtering, derived from the ideal filter described with reference to FIG. 10B, to the input audio signal in order to achieve two different types of compression.

The configuration of side-chain compressor circuit 1111 and split-band compressor circuit 1121 will be familiar to those skilled in the art, as they are commonly used in "de-essers" in order to reduce or eliminate excess sibilant frequencies present in recordings of the human voice.

Side-chain compressor circuit 1111 implements level reduction of the entire input audio signal when resonant frequencies are present, whilst split-band compressor circuit 1121 implements level reduction of only the resonant frequencies when they are present in the input audio signal.

Side-chain compressor circuit 1111 includes a compressor 1112 having a side-chain including an equalizer 1113 that filters the input audio signal such that resonant frequencies of the device are most prominent. This implements an equalization curve that reduces the level of the input audio signal at all frequencies but the resonant frequencies, thereby creating a control signal. This control signal is used to trigger to the compressor, whereby compressor 1112 reduces the level of the entire input audio signal in first signal path at a degree determined by the level of the control signal produced by equalizer 1113.

Split-band compressor circuit 1121 includes a crossover 1122 that splits the input audio signal into two paths: one signal that includes the resonant frequencies defined by the filter and another signal that does not. The signal containing the resonant frequencies is sent to a compressor 1123, where it is compressed in accordance with the attenuation required by the filter. The other signal bypasses compressor 1123, and it and the output signal from compressor 1123 are then combined back into one signal in a summing circuit 1124.

The outputs from side-chain compressor circuit 1111 and split-band compressor circuit 1121 are then added in a summing circuit 1103. Summing circuit 1103 is configured to combine the outputs in a prescribed ratio, which is, in an embodiment, between 9:1 and 1:9. It has been found that a particularly pleasing auditory experience is had when the two outputs are added in a 1:1 ratio.

A microcontroller 1104 is also present within processing apparatus 1101, and controls equalizer 1112 in side-chain compressor circuit 1104 and crossover 1121 split-band compressor circuit 1106. In this embodiment, microcontroller 1105 has a volume control input 1106, which is adapted to receive a signal indicative of the selected amplification level of the input audio signal, and can therefore configure equalizer 1112 with different equalization curves and crossover 1121 with different filters in dependence upon the volume level selected in the device in which processing apparatus 1101 is present.

FIG. 12

Figure 12:
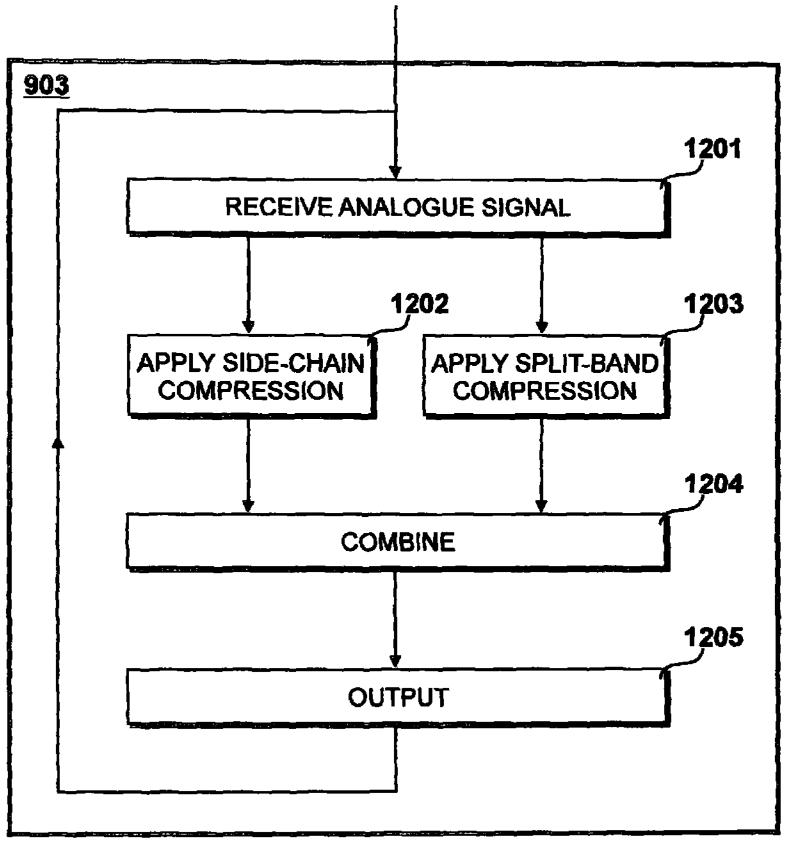
FIG. 12 shows a procedure followed by the first signal processing apparatus.

An overview of procedures carried out during step 903 when processing apparatus 1101 is implemented in an audio reproduction device, are illustrated in FIG. 12.

At step 1201, an analog signal is received. At step 1202, side-chain compression is applied, running in parallel to the application of split-band compression at step 1203. The resulting signals from steps 1202 and 1203 are combined at step 1204 in a prescribed ratio, which, in an embodiment, is between 9:1 and 1:9, and, in an embodiment exhibiting particularly advantageous outcomes, a ratio of 1:1 is used. Following the combination of the signals, the resulting signal is output at step 1205 for amplification and reproduction by a loudspeaker.

Figure 13A:
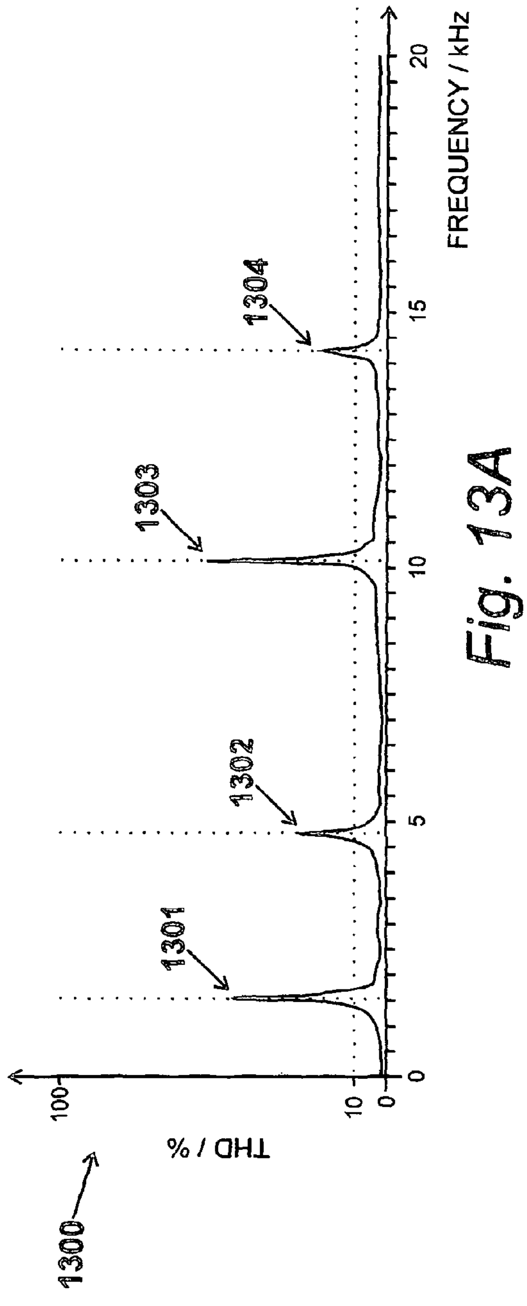
FIGS. 13A and 13B illustrate total harmonic distortion and a corresponding filter for digital processing.
Figure 13B:
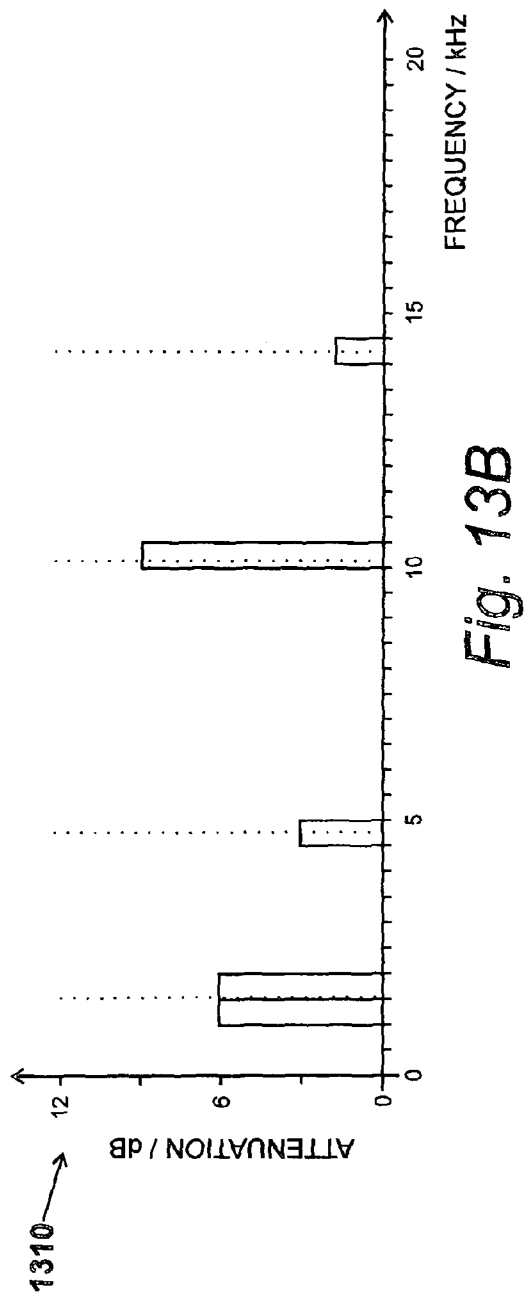

FIGS. 13 and 13B

As described previously, a second processing approach for reducing total harmonic distortion involves processing an input audio signal in the digital domain. A particularly useful tool in this approach is the Fourier transform, which, as the skilled reader will appreciate, takes a time domain signal and transforms it to the frequency domain by decomposing it into its frequency components.

If we consider the input audio signal as a pulse code modulation (PCM) stream, a set of, say, 512 samples may be windowed, using for instance a Hann window function or an approximation thereof, and then a discrete Fourier transform (DFT) taken. The resulting transform provides coefficients encoding the phase and power of each frequency component present in that particular set of samples of the input audio signal. In an embodiment, the Fourier transform employed is a Fast Fourier Transform (FFT), which provides an accurate transform in a short time period, although alternative DFTs can be used, such as the Modified Discrete Fourier Transform.

The present invention makes use of the properties of the Fourier transform, and thus, in the digital processing approach, modifies the power coefficients of frequency components of a sample corresponding to a resonant frequency of a device.

FIG. 13A illustrates the same total harmonic distortion plot at 1300 as is shown in FIG. 11A. Peaks 1301, 1302, 1303 and 1304 are present at frequencies of 1.5 kilohertz, 4.75 kilohertz, 10 kilohertz and 14.25 kilohertz respectively. The digital approach to processing input audio signals to mitigate the effect of distortion in a device having these resonant frequencies involves the selection of specific frequency bands to apply attenuation to. These are shown at the plot in FIG. 13B at 1310, which plots the same information as plot 1110. However, it is frequency bands that result from the Fourier transform of an input audio signal that have attenuation applied to them, with a degree of attenuation related to the level of total harmonic distortion at the particular frequency.

FIG. 14

Figure 14:
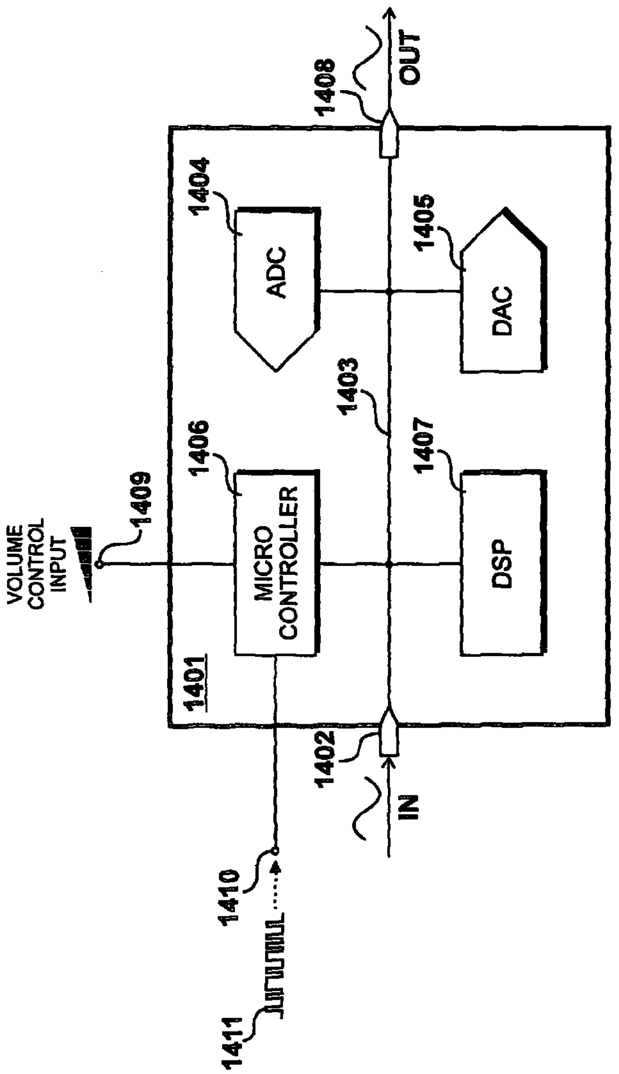
FIG. 14 shows a second signal processing apparatus for processing audio in the digital domain.

A second audio signal processing apparatus 1401 is illustrated in FIG. 14, suitable for implementing the principles of the present invention and fulfilling the role of signal processor 302.

An input interface 1402 is configured to receive an input audio signal and provide it to a processing bus 1403. Connected to processing bus 1403 is an analog-to-digital converter (ADC) 1404 and a digital-to-analog-converter (DAC) 1405. In addition, a microcontroller 1406 and a digital signal processor (DSP) 1407 are also connected to processing bus 1403. DSP 1407 acts as a co-processor to microcontroller 1406, as for certain tasks, such as mathematical operations, it provides increased performance. Such a combination of a microcontroller and a digital signal processor is sometimes referred to in the art as a "digital signal controller".

Each component can therefore communicate over the bus, therefore allowing the sharing of information. Microcontroller 1406 also includes a data interface 1410, over which program instructions (illustrated as 1411) may be conveyed and then stored and executed by microcontroller 1406 in cooperation with DSP 1407.

If the input audio signal provided to input interface 1402 is an analog signal, ADC 1404 will sample it in order to provide a digital signal to microcontroller 1406 and DSP 1407. In this embodiment, ADC 1404 and DAC 1405 are 16-bit, 44.1 kilohertz components, but in if a higher quality conversion is required, processing apparatus 1401 could include 24-bit, 96 kilohertz parts instead.

Following processing of the input audio signal by microcontroller 1406 and DSP 1407, the resulting processed signal is either converted into an analog signal by DAC 1405 and provided to an output interface 1408 for amplification, or, if the amplifier present in the device is a suitable amplifier (operating in switched or Class D mode, say), then the digital processed signal can be provided to output interface 1408.

In a similar way to the configuration of processing apparatus 1101, microcontroller 1406 has a volume control input 1409, which is adapted to receive a signal indicative of the selected amplification level of the input audio signal, and can therefore process the input audio signal in dependence upon the volume level selected in the device in which processing apparatus 1401 is present.

FIG. 15

Figure 15:
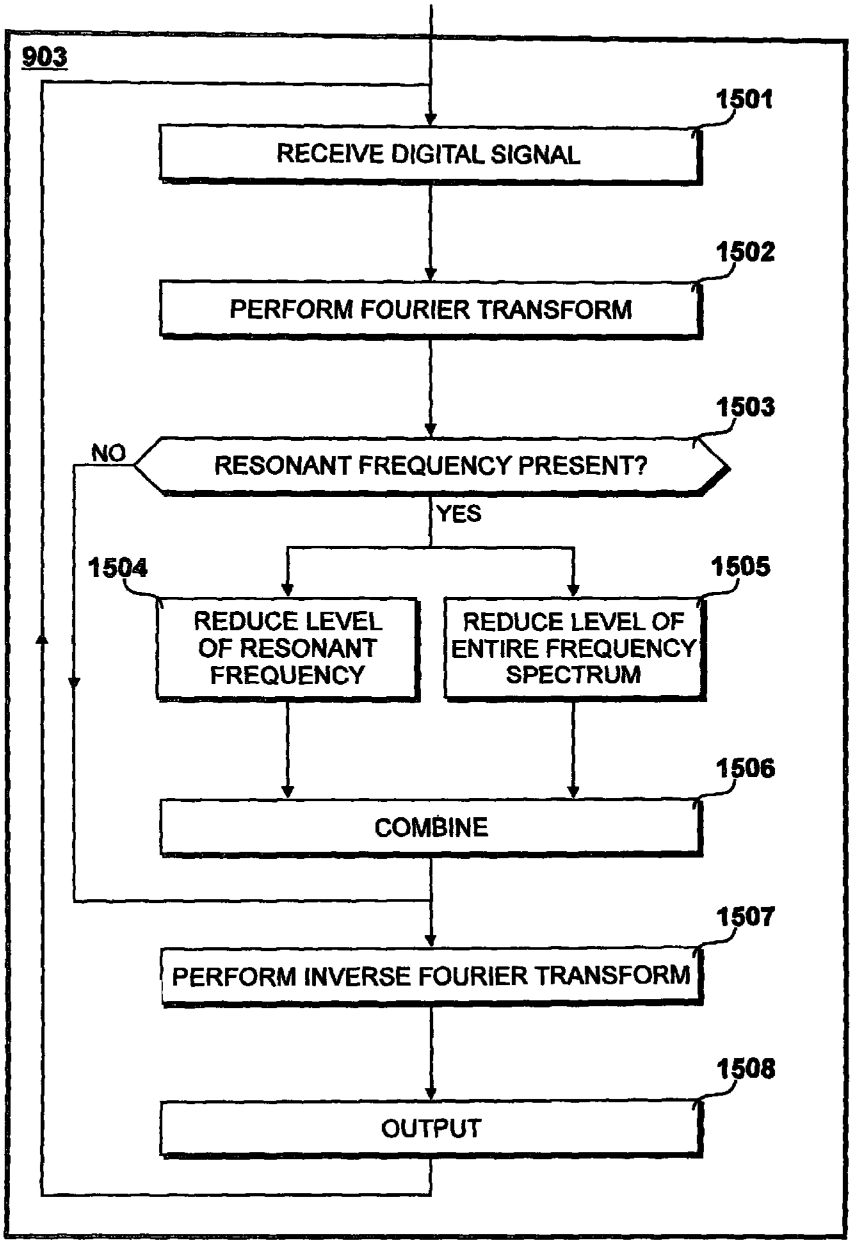
FIG. 15 shows a procedure followed by the second signal processing apparatus.

An overview of procedures carried out during step 1003 when processing apparatus 1401 is implemented in an audio reproduction device, are illustrated in FIG. 15. It will be appreciated that the procedural steps carried out in this digital processing implementation will be performed by microcontroller 1406 in cooperation with DSP 1407.

At step 1501, a set of digital samples (512, in an embodiment) of an input audio signal is received, either directly from input interface 1402 or over processing bus 1403 following analog-to-digital conversion by ADC 1404. At step 1502, a Fourier transform is performed on set of digital samples, which, in this embodiment is a discrete time Fourier transform utilizing Fast Fourier Transform processing techniques. This step could possibly include windowing of the set of digital samples.

The Fourier transform results in the creation of a frequency spectrum for the set of digital samples, which, as will be appreciated by those skilled in the art, is represented by a number of frequency bins containing complex numbers encoding the power and phase coefficients for particular frequencies. In this example, the Fourier transform used creates 512 frequency bins, but more or fewer could be specified in dependence upon the processing capability available.

The frequency spectrum is analyzed to ascertain if any resonant frequencies are present in the sample when the question at step 1503 is asked. If answered in the affirmative, to the effect that one or more resonant frequencies are present, then control proceeds to 1504 where the level of only the resonant frequency or frequencies present in the frequency spectrum is reduced in accordance with the scaling factors specified by the filter constructed during device characterization, and previously described with reference to FIG. 13B. This creates a first processed signal in a manner similar to split-band compression.

At the same time as the process of split-band compression at step 1504, step 1505 is performed where the level of the entire frequency spectrum is reduced according a prescribed scaling factor, which may or may not (depending upon the implementation of the principles of the present invention) take into account the currently selected volume level. In any event, the scaling factor is between zero and unity, and is selected according to the results of the characterization of the particular device processing apparatus 1401 is operating within. The scaling factor is used to modify the power coefficients in all of the bins of the output of the Fourier transform, and creates a second processed signal in a similar manner to side-chain compression.

At step 1506, the first and second processed signals are combined to produce a combined signal. In a similar way to summing circuit 1103, the two signals are combined in a weighted manner, with the selection of ratios the same as previously described with reference to FIG. 11. Following step 1506, or if the question asked at step 1503 is answered in the negative, to the effect that no resonant frequency is present, an inverse Fourier transform is performed at step 1507. Following this, the resulting time domain set of digital samples is output at step 1508, whereupon overlap-add methods or similar may be used to reconstruct an audio stream for application to either DAC 1405 for digital-to-analog conversion or directly to, say, a Class D amplifier. Control then returns to step 1501 where the next set of digital samples is received and processing continues.

It will be appreciated by those skilled in the art that the procedure carried out by processing apparatus 1401 could also be implemented on a standard computer workstation, and thus the instructions could be provided either over a network or on a computer-readable medium such as a CD-ROM.

The invention claimed is:

1. A method comprising processing an input audio signal to reduce total harmonic distortion of the input audio signal when the audio signal is reproduced by a loudspeaker, said loudspeaker being located within an audio reproduction device having an enclosure with an associated resonant frequency, said method including steps of:

(a) receiving said input audio signal, which includes the resonant frequency of the enclosure, and wherein said input audio signal is represented by digital samples which are a time-domain representation of said input audio signal;

(b) performing a Fourier transform to produce a frequency-domain representation of said input audio signal;

(c) reducing, in the frequency domain, the level of said input audio signal at the resonant frequency of the enclosure, thereby producing a first processed signal;

(d) reducing, in the frequency domain, the level of said input audio signal at all frequencies, thereby producing a second processed signal;

(e) combining, in the frequency domain, said first processed signal and said second processed signal;

(f) performing an inverse Fourier transform to produce a time-domain output audio signal.

2. The method of claim 1, further including a step of receiving an indication of a selected amplification level for said input audio signal, and wherein the degree of level reduction in steps (c) and (d) of claim 1 is determined by the selected amplification level.

3. The method of claim 1, wherein the selected ratio for combining said first processed signal and said second processed signal is between 9:1 and 1:9.

4. The method of claim 1, wherein the selected ratio for combining said first processed signal and said second processed signal is 1:1.

5. The method of claim 1, wherein said resonant frequency is determined by a process of empirical testing.

6. The method of claim 3, wherein said process of empirical testing comprises steps of:

locating said apparatus in a substantially anechoic chamber;

placing a microphone at a notional listening position relative to said apparatus; and for each amplification level permitted by said apparatus:

supplying an input signal to said apparatus comprising a plurality of sine waves of differing frequencies;

evaluating the total harmonic distortion exhibited by said apparatus by analyzing an output signal from said microphone;

recording as a resonant frequency a frequency at which the total harmonic distortion of the output signal from said microphone is above a threshold level.

7. An audio reproduction system, comprising an amplifier, a loudspeaker, an enclosure with an associated resonant frequency, and a processing device for processing an input audio signal to reduce the degree of total harmonic distortion exhibited by said apparatus when it is reproduced by said loudspeaker, wherein said processor is configured to:

(a) receive said input audio signal, which includes the resonant frequency of the enclosure, and wherein said input audio signal is represented by digital samples which are a time-domain representation of said input audio signal;

(b) perform a Fourier transform to produce a frequency-domain representation of said input audio signal;

(c) reduce, in the frequency domain, the level of said input audio signal at the resonant frequency of said enclosure to produce a first processed signal;

(d) reduce, in the frequency domain, the level of said input audio signal at all frequencies to produce a second processed signal;

(e) combine, in the frequency domain, said first processed signal and said second processed signal;

(f) perform an inverse Fourier transform to produce a time-domain output audio signal for amplification by said amplifier.

8. The audio reproduction system of claim 7, wherein said processor is configured to receive an indication of a selected amplification level for said input audio signal, and wherein the degree of level reduction in steps (c) and (d) of claim 7 is determined by the selected amplification level.

9. The audio reproduction system of claim 7, wherein said audio reproduction system is one of:

a television;

a tablet computer;

a mobile telephone;

a personal computer; or a stereo system.

10. Audio processing apparatus for processing an input audio signal to reduce the degree of total harmonic distortion exhibited by an audio reproduction system when said input audio signal is reproduced by a loudspeaker located therein, said audio reproduction system having an enclosure with an associated resonant frequency, and wherein said audio processing apparatus comprises an input interface configured to receive an input audio signal, an output interface configured to output an output audio signal, and a processor configured to:

(a) receive an input audio signal via said input interface, wherein said input audio signal includes the resonant frequency of the enclosure, and wherein said input audio signal is represented by digital samples which are a time-domain representation of said input audio signal;

(b) perform a Fourier transform to produce a frequency-domain representation of said input audio signal;

(c) reduce, in the frequency domain, the level of said input audio signal at the resonant frequency of said enclosure to produce a first processed signal;

(d) reduce, in the frequency domain, the level of said input audio signal at all frequencies to produce a second processed signal;

(e) combine, in the frequency domain, said first processed signal and said second processed signal;

(f) perform an inverse Fourier transform to produce a time-domain output audio signal for output via said output interface.

11. The audio processing apparatus of claim 10, wherein said processor is configured to receive an indication of a selected amplification level for said input audio signal, and wherein the degree of level reduction in steps (c) and (d) of claim 10 is determined by the selected amplification level.

12. The audio processing apparatus of claim 10, configured to form part of one of:

a television;

a tablet computer;

a mobile telephone;

a personal computer; or a stereo system.

13. A non-transitory computer-readable medium encoded with program instructions executable by a computer that, when executed by the computer, cause the computer to perform the method defined by claim 1.

* * * * *